United States Patent
Larabie-Belanger et al.

(10) Patent No.: US 9,912,651 B2
(45) Date of Patent: Mar. 6, 2018

(54) AUTHENTICATED SERVER VIEWS

(71) Applicant: Dropbox, Inc., San Francisco, CA (US)

(72) Inventors: Maxime Larabie-Belanger, San Francisco, CA (US); Sang Tian, San Francisco, CA (US); Joshua Kaplan, San Francisco, CA (US); Eduardo Escardo Raffo, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 177 days.

(21) Appl. No.: 14/881,629

(22) Filed: Oct. 13, 2015

(65) Prior Publication Data

US 2017/0104743 A1    Apr. 13, 2017

(51) Int. Cl.
  *H04L 29/06*   (2006.01)
(52) U.S. Cl.
  CPC ................... *H04L 63/08* (2013.01)
(58) Field of Classification Search
  CPC .......... G06F 15/16; G06F 3/048; G06F 17/21; G06F 17/24; G06F 3/00; H04L 9/00; H04L 63/08; H04L 9/32; H04W 12/06; H04K 1/00
  USPC ........ 709/217, 203, 218, 219, 229; 726/7, 4, 726/3; 715/800, 234, 274, 700, 764, 781, 715/788; 713/168, 171
  See application file for complete search history.

(56) References Cited

U.S. PATENT DOCUMENTS

| | | | |
|---|---|---|---|
| 7,392,535 B2* | 6/2008 | Horikiri | G06F 21/6218 709/229 |
| 7,730,418 B2* | 6/2010 | Wang | G06F 9/4443 715/700 |
| 8,195,763 B2* | 6/2012 | Knowles | G06F 17/30902 709/217 |
| 8,914,900 B2 | 12/2014 | Smith et al. | |
| 2006/0129632 A1* | 6/2006 | Blume | G06F 3/122 709/203 |
| 2013/0097517 A1 | 4/2013 | Reiss et al. | |
| 2013/0246901 A1 | 9/2013 | Massand | |
| 2013/0290404 A1 | 10/2013 | Rajabi et al. | |
| 2014/0053074 A1 | 2/2014 | Kim et al. | |

\* cited by examiner

Primary Examiner — Thanhnga B Truong
(74) Attorney, Agent, or Firm — Polsinelli PC

(57) ABSTRACT

An example computer implemented method to create an authenticated server view includes sending a client secret to an online-synchronized content management system and receiving an authentication key. The example method can then include generating a server view of the online-synchronized content management system using instantiation data. The instantiation data can include a resource address and the authentication key. The server view can be configured to request server elements from the online-synchronized content management system using the instantiation data and render the server elements.

21 Claims, 6 Drawing Sheets

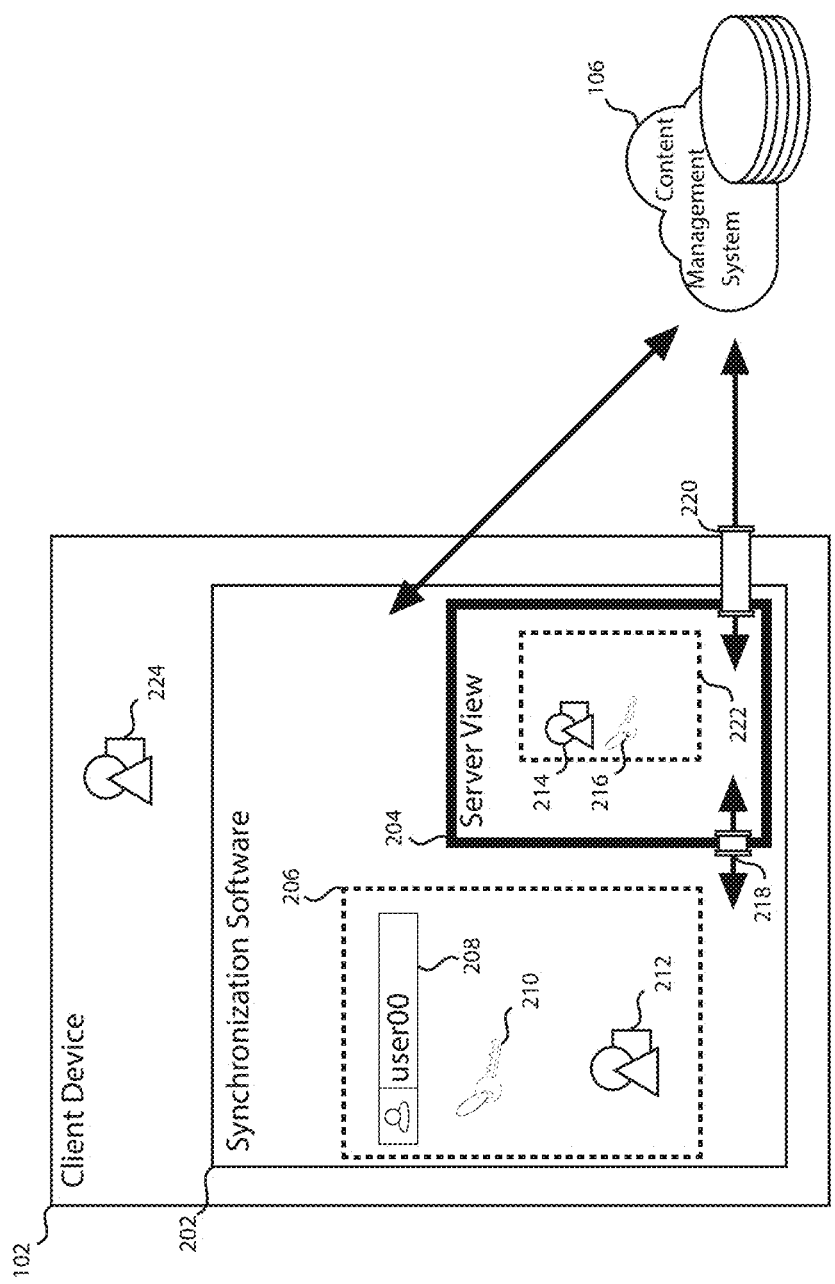

AUTHENTICATED SERVER VIEWS

BACKGROUND

Traditionally, software that is destined for running on client devices has a lengthy release cycle. This release cycle can require days, weeks, or a number of months, to pass between major releases of the software. Thus giving developers time to fully test additional features and components in the software. However, this lengthy release cycle inhibits rapid deployment of features that do not require such extensive testing. Publishing incremental versions of the software between the major releases can be costly for the publisher and frustrating for users who might be bothered by repeated requests to update the software. What is needed is a technique for updating portions of the software without requiring a full update to the software.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for creating an authenticated server view.

An example computer implemented method to create an authenticated server view includes sending a client secret to an online-synchronized content management system and receiving an authentication key. The example method can then include generating a server view of the online-synchronized content management system using instantiation data. The instantiation data can include a resource address and the authentication key. The server view can be configured to request server elements from the online-synchronized content management system using the instantiation data and render the server elements.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2 shows an example configuration of a client device in accordance with some embodiments;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for creating and maintaining an authenticated server view. Traditionally, software that is destined for running on client devices has a lengthy release cycle. This release cycle can require days, weeks, or a number of months, to pass between major releases of the software. Thus giving developers time to fully test additional features and components in the software. However, this lengthy release cycle inhibits rapid deployment of features that do not require such extensive testing. Publishing incremental versions of the software between the major releases can be costly for the publisher and frustrating for users who might be bothered by repeated requests to update the software. A solution to this problem is creating a server view within the software that can display server elements retrieved from content management system. This server view can be provided an authentication key so that it can request server elements specific to a user.

Figure 1:
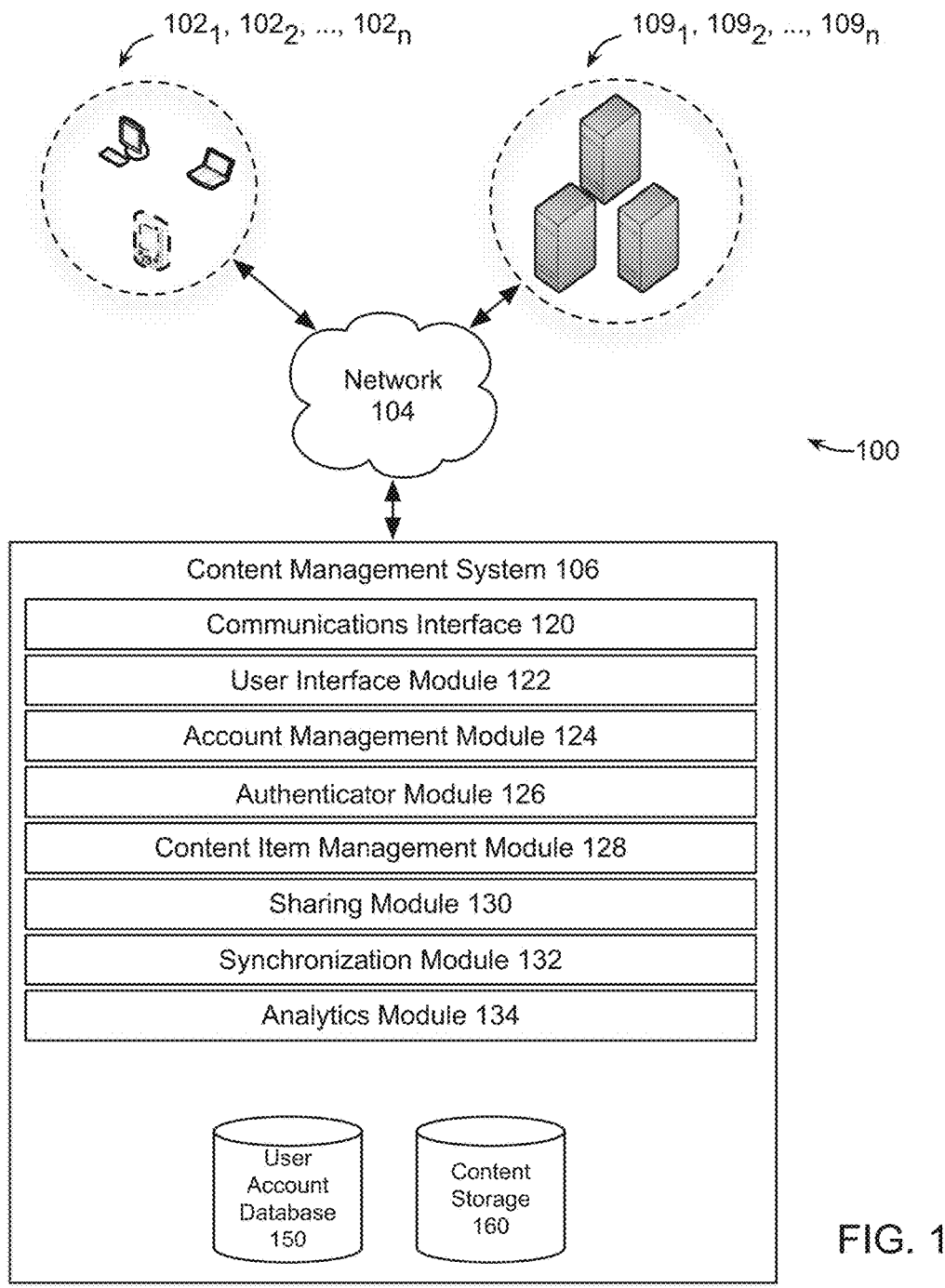
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device 102$_i$ can upload content to content management system 106 via network 104. Later, the same client device 102$_i$ or some other client device 102$_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102$_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

FIG. 2 depicts an example configuration of client device 102 and content management system 106. In some embodiments, server view 204 can run within synchronization software 202 running on client device 102, resulting in a hybrid display that includes server elements 214, program elements 212, and operating system elements 224. Synchronization software can display program elements 212 and then reserve a space for server view 204 as shown later in FIG. 3C.

Server view 204 can be a rendering system that retrieves server elements 214 from content management system 106 for display. For example, server view 204 can be a web browser integrated with synchronization software 202 that interacts with content management system 106 via a web protocol such as HTTP. In some embodiments, server elements 214 include at least one of server content elements (e.g., HTML elements, text, media, etc.), server style elements (e.g., cascading style sheets, HTML attributes, etc.), and server script elements (e.g., JavaScript, binary executable code, or other executable instructions). Server view 204 can render (e.g., display) server elements 214. In some embodiments, server view 204 renders program elements 212 as well as server elements 214 within the same rendering area. For example, certain program elements 212 such as a logo can be rendered along with server elements 214 such as text. Combining program elements 212 with server elements 214 in server view 204 can minimize traffic to content management system 106 because certain elements (e.g., program elements 212) are provided by synchronization software 202 running on client device 102. However, combining program elements 212 with server elements 214 in the same server view 204 can raise various security concerns and, in some embodiments, server view 204 is limited to not display program elements 212. In addition, mixing program elements 212 with server elements 214 can unnecessarily delay the showing of program elements 212 until server elements 214 are ready for rendering. In some embodiments, one server view 204 only displays program elements 212 while a second server view 204 only displays server elements 214.

In some embodiments, server view 204 stores server elements 214 in server view cache 222. This enables server view 204 to avoid re-requesting server elements 214 that it already has retrieved from content management system 106.

In some embodiments, server view 204 is "sandboxed" from synchronization software 202. Being sandboxed means that the server view is generally isolated from synchronization software 202, as well as other programs running on client device 102. Specifically, server view 204 can have a tightly controlled set of resources such as scratch space (e.g., server view cache 222) on disk and memory. In some embodiments, synchronization software 202 contains client secret 210 associated with a user. Client secret 210 can be generated by sending user identifier 208 and password (or derivatives thereof) to content management system 106, which can then generate and send client secret 210 to synchronization software 202. Client secret 210 can be used later for API calls and transactions with content management system 106. In some embodiments, transactions with content management system 106 only require client secret 210; alternatively, transactions with content management system 106 can require client secret 210 and user identifier 208. In some embodiments, it can be difficult or undesirable to grant server view 204 access to client secret 210. For example, server view 204 may be sandboxed or less trustworthy. In some embodiments, server view 204 has a limited connection (such as API 218) to synchronization software 202. In some embodiments, client secret 210 is associated with a set of account privileges (e.g., create, view, or delete content items, change or view account details, purchase services, send or receive content management system 106 notifications, etc.) and server view 204 only requires a subset of those account privileges. In some embodiments, server view 204 can use authentication key 216 for retrieving server content 214 from content management system 106.

Authentication key 216 and client secret 210 can both be tokens for interacting with content management system 106. In some embodiments, authentication key 216 and client secret 210 are associated with different privileges; in some embodiments, authentication key 216 has a subset of the privileges that client secret 210 has. In some embodiments, authentication key 216 is part of or contained in a browser cookie. In some embodiments, authentication key 216 is generated from client secret 210. In some embodiments, authentication key 216 includes a username and/or password for the user.

In some embodiments, synchronization software 202 transfers (e.g., by API 218) authentication key 216 to server view 204 for storage and use. In such embodiments, synchronization software 202 generates authentication key 216 using client secret 210. For example, synchronization software 202 can encrypt at least a portion of client secret 210 using a code that is communicated with content management system 106, the result being authentication key 216. Content management system 106 can then use the code to decrypt and verify authentication key 216. Alternatively, synchronization software can request authentication key 216 from content management system 106. In some embodiments, content management system 106 provides (e.g., generates) authentication key 216 when providing (e.g., generating) client secret 210. In some embodiments, authentication key 216 has an expiration time and server view 204 must receive a new authentication key 216 upon expiration of the old one. In some embodiments, multiple authentication keys 216 can be associated with or generated from a single client secret 210.

In some embodiments, connection 220 from server view 204 to content management system 106 can be limited in various ways. For example, server view 204 can be allowed to only access content hosted by content management system 106. In some embodiments, this means being limited to at least one of a domain name, collection of domain names, IP address, and a collection of IP addresses. In some embodiments, connection 220 is limited to a protocol (e.g., HTTP, FTP, SSH, etc.). In some embodiments, connection 220 is required to use encryption. Any connection that is outside of predefined restrictions can be blocked or dropped by server view 204, synchronization software 202, or client device 102. If a connection is blocked or dropped, server view 204 can display an indication that the content is unavailable while offline. In some embodiments, server view 204 can prevent traditional error messages from displaying (e.g., HTTP status codes such as 4xx and 5xx codes).

In some embodiments, server view 204 can attempt to retrieve server content 214 and, if authentication key 216 is required, server view 204 can request authentication key 216 from synchronization software 202 or content management system 106. For example, server view 204 might attempt to access a web page (e.g., server content 214) from content management system 106 and content management system 106 might return a web page that contains a login screen. Instead of rendering the login screen on client device 102, server view 204 can supply login information (e.g., by requesting login information from synchronization software 202 such as authentication key 216) and become authenticated for retrieving the web page, which it can then receive and render. If login information is not available, server view 204 can display an indicator that a network connection is required to view the content or display nothing at all.

In some embodiments, server view 204 does not render server elements 214, instead it can transfer server elements 214 to synchronization software 202 or an operating system running on client device 102 for rendering and display.

In order to instantiate server view 204, synchronization software 202 can provide server view 204 instantiation data. Instantiation data can include user identifier 208, authentication key 216, display parameters (e.g., length and width of server view 204, color scheme information), program content 212, localization preferences (e.g., language, locale), resource address (e.g., URL), etc. In some embodiments where a resource address is included in instantiation data, server view 204 can request server elements 214 from that resource address.

Figure 3B:
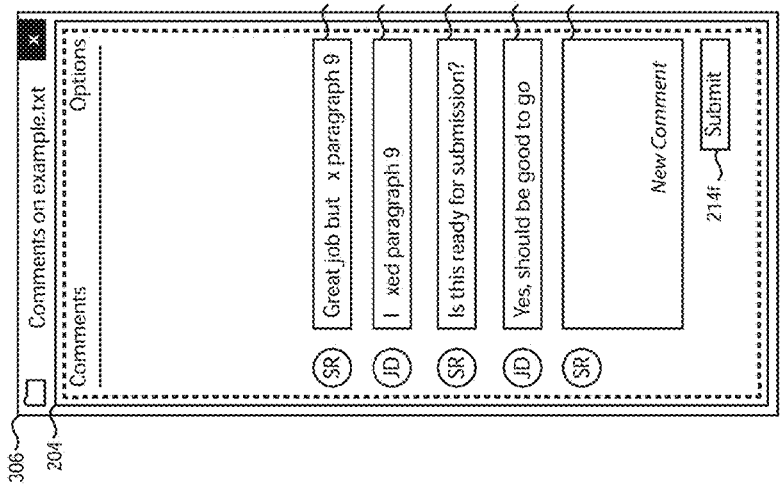
FIGS. 3A-3D show example server views in accordance with some embodiments.
Figure 3A:
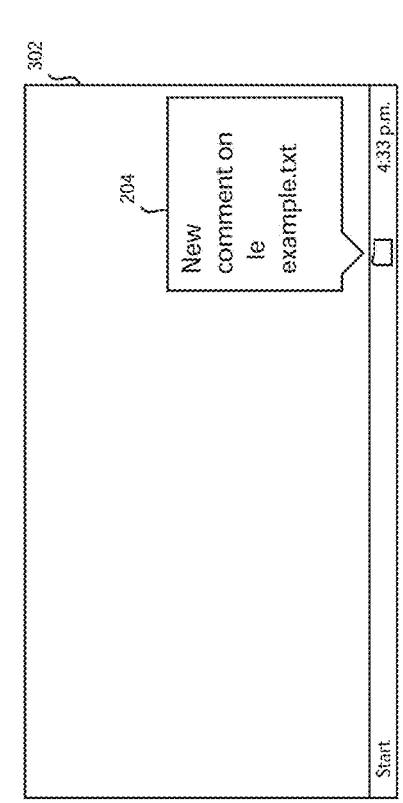
Figure 3C:
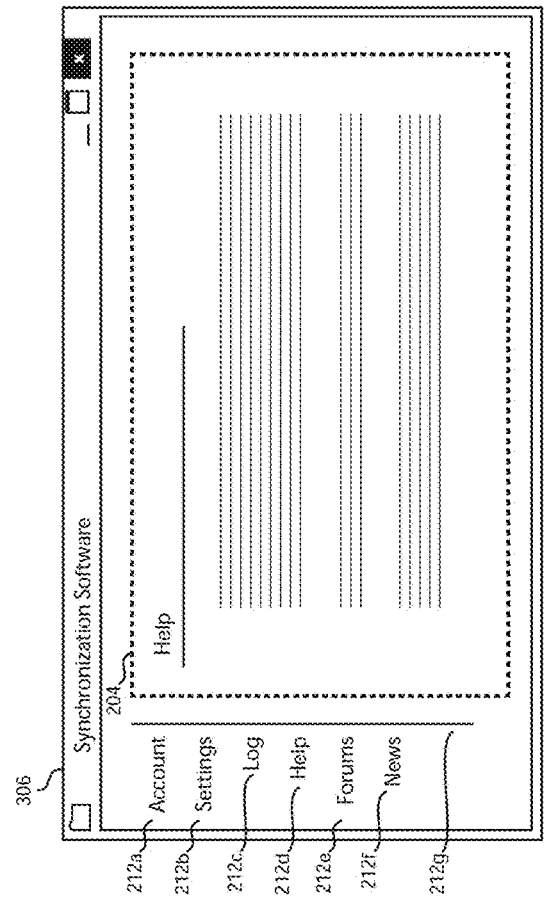

FIGS. 3A-3D depict various embodiments of server view 204. For example, in FIG. 3A, server view 204 is a notification within the context of desktop environment 302. Server view 204 can contain text as shown in FIG. 3A ("new comment on file example.txt"). Server view 204 notification can be in a desktop environment 302 (as depicted), a mobile environment (e.g., a drop-down notification), or other environment. In some embodiments, synchronization software 202 receives a notice from content management system 106 that a notification is available and synchronization software 202 instantiates server view 204. Server view 204 can then load server content 214 from content management system 106 for display within desktop environment 302 as a notification.

In some embodiments, a first server view 204 such as depicted in FIG. 3A can be activated (e.g., clicked or selected) in order to instantiate a second server view 204 such as depicted in FIG. 3B. In some embodiments, server view 204 contains a link (e.g., a hyperlink). Synchronization software 202 can intercept the link and instantiate a new server view 204 with instantiation data including the link. In some embodiments, multiple server views 204 can share the same server view cache 222. In some embodiments, a child server view 204 can be created from a parent server view 204 (e.g., server view 204 in FIG. 3B can be a child of server view 204 in FIG. 3A). In some such embodiments, a parent server view 204 can share server view cache 222 with all descendent server views 204. Alternatively, each server view 204 can have an independent server view cache 222. In some embodiments, when server view 204 is closed, terminated, or no longer rendered, server view cache 222 remains and is available for the next time server view 204 is instantiated. In embodiments where server view cache 222 is shared between server views 204 or remains between instantiations, instantiation data can omit data already contained within server view cache 222 (e.g., authentication key 216).

Server view window 306 can contain server view 204 as a self-contained unit. For example, in FIG. 3B, server content $214_a$-$214_f$ can be received from content management system 106 or server view cache 222. In some embodiments, server content can include text (e.g., server content $214_a$-$214_d$), user-input sections (e.g., server content $214_e$), buttons (e.g., server content $214_f$), graphics, videos, games, etc. In some embodiments, server view 204 can maintain a session with content management system 106 whereby server view 204 sends and receives data (e.g., server content 214) with content management system 106. Server content 214 can also include style instructions to indicate where and how server content 214 should be displayed within server view 214.

In some embodiments, window 306 for synchronization software 202 can render server view 204 (with server content 214) as well as program content $212_a$-$212_g$. For example, a user can select program content $212_d$ ("Help") and synchronization software 202 can instantiate server view 204 with a URL of "http://www.example.com/help". If a user wishes to then navigate to "Account" by clicking program content $212_a$, synchronization software 202 can determine that server view 204 should be closed and replaced with a window full of program content 212 or another server view 204 if appropriate. In some embodiments, synchronization software has an option to render program content 212 or server content 214 within the same area. In some such embodiments, synchronization software 202 can render program content 212 until server content 214 is ready for rendering, then synchronization software 202 can replace program content 212 with server content 214. For example, if server window 204 contains "help information," it might render program content 212 at first. This program content 212 might include generic information, header information, possibly out-of-date information, etc. As server content 214 gets loaded, it can be rendered within server view 204. For example, program content 212 can include a static and relatively unchanging header portion but as a user scrolls down, server content 214 can be revealed below. In some embodiments, program content 212 might be out-of-date and need to be replaced. For example, server view 204 can first render the out-of-date program content 212 such as a graphic or logo and then determine that an updated version of program content 212 is available which it can download as server content 214 and replace the out-of-date program content 212. This replacement can be immediate (stop displaying the out-of-date program content 212 and render the server content 214), gradual (fade between the two), or delayed (only replace the out-of-date program content 212 after it is no longer displayed; e.g., if server view 204 is scrolled so that the out-of-date program content is hidden).

Figure 3D:
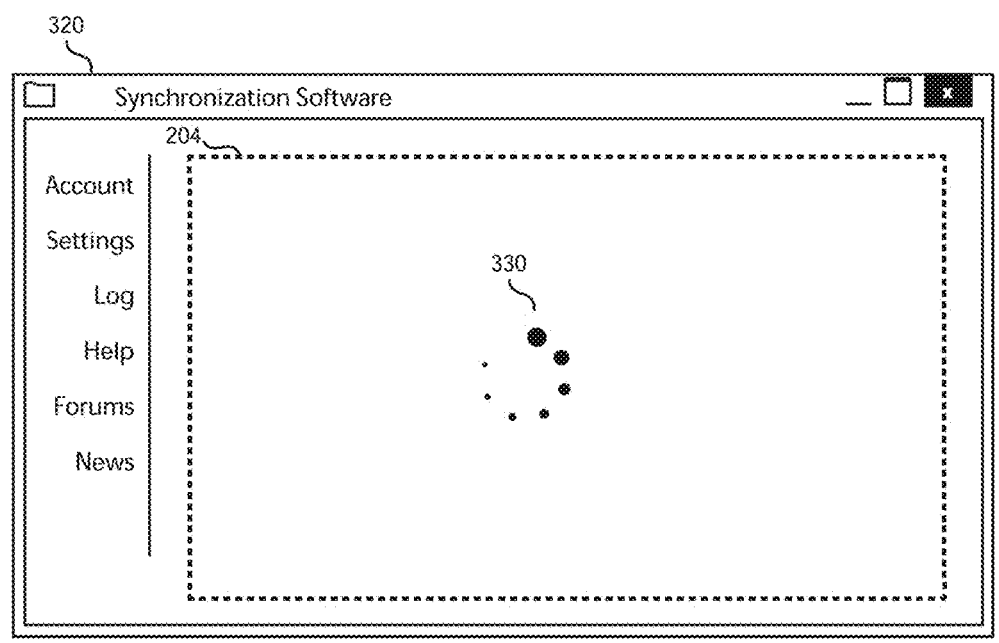

FIG. 3D depicts loading screen 320 in which server view 204 shows indicator 330 that server view 204 is not yet ready for display. In some embodiments, there is a delay before server view 204 is available for display. For example, server content 214 might take time to finish downloading or server content 214 can include a script that influences how server content 214 should be rendered. Instead of gradually "popping" in server elements and have them change according to the script, server view 204 can run a script that instructs server view to display indicator 330 until server view 204 is ready for display.

Many "apps" or "programs" that run on a computer have different user interface philosophies and users might have a certain level of trust towards these apps or programs. It can be jarring for a user to experience server view 204 within the context of synchronization software 202. Therefore, in some embodiments, indicator 330 is utilized to preserve a cohesive design and use philosophy. In some embodiments, server view 204 has the capability to engage server content 214 as if it were a web browser (e.g., pinch-zooming, the ability to view source code, autofill capabilities, etc.); in some such embodiments, synchronization program can disable some or all of these capabilities or replace them with capabilities consistent with the app or program. For example, server view 204 by default might have a generic "right-click" menu, while synchronization software 202 can change the right-click behavior to better align with synchronization software 202.

In some embodiments, server view 204 requests server content 214 based on the localization preferences (e.g., locale) of synchronization software 202. This can mean that the request can ignore the localization preferences of client device 102. For example, instantiating server view 204 without a localization preference may result in server view 204 using client device's 102 preference, or content management system 106 might use localization preferences associated with the particular user for an online interface. For example, a user might configure an online interface of content management system 106 to be in French, while client device 102 might be in Japanese, and synchronization software 202 might be in English. It might be disrupting for the user to be using synchronization software 202 configured for one localization (e.g., with program elements 212 in English) if server view 204 presents elements configured for another localization (e.g., with server elements 214 in French). In some embodiments, content management system 106 determines that the request for server elements 214 comes from synchronization software 202 and determines the localization preference of synchronization software 202 and sends server elements 214 according to that localization preference.

Figure 4:
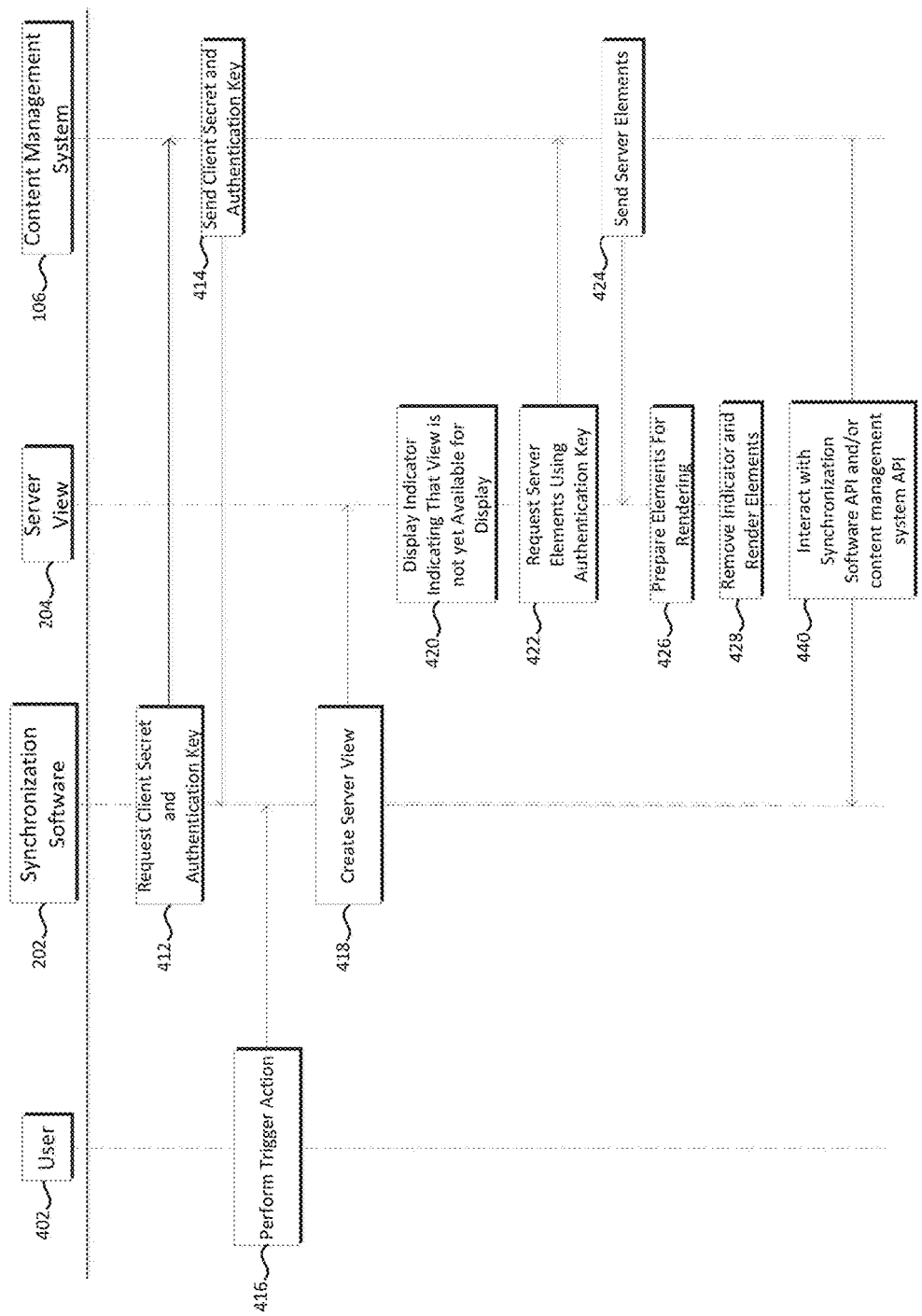
FIG. 4 shows an example flowchart in accordance with some embodiments.

FIG. 4 depicts example actions between user 402, synchronization software 202, server view 204, and content management system 106. First, synchronization software 202 can request client secret 210 authentication key 216 (action 412) from content management system 106. This request can include validation information (e.g., user identifier 208 and/or username and password). In some embodiments, action 412 does not request client secret 210; rather, synchronization software 202 can have previously received client secret 210 and action 210 uses client secret 210 for validating the request. In response, content management system 106 can send authentication key 216 to synchronization software 202 (action 414). Later, user 402 can perform a trigger action (action 416). This trigger action can include navigating synchronization software 202 to a certain location or requesting a resource. In some embodiments, another entity that is not user 402 performs the trigger action, for example, content management system 106 can send synchronization software 202 a notification. In some embodiments, action 416 is performed before, and triggers, action 412. Synchronization software 202 can then detect the trigger action and, in response, create server view 204 (action 418). As described above, creating (e.g., instantiating) server view 202 can include providing authentication key 216 and other configuration information.

Server view 202 can then display indicator 330 indicating that the view is not yet available for display (action 420), as described previously with FIG. 3D. Server view 202 can then request server elements 214 using authentication key 216 from content management system 106 (action 422). In some embodiments, action 422 includes sending at least a portion of instantiation data to content management system 106. For example, if instantiation data includes a window size, a resource location, and authentication key 216, only the resource location and authentication key 216 might be part of the request. In some embodiments, action 422 omits authentication key 216. Content management system 106 can then send server elements 214 to server view 202 (action 424). In some embodiments, content management system 106 detects that the request comes from server view 204 and provides server elements 214 that are only available to a server view and not available through web access. In some embodiments, content management system 106 sends server elements 214 to synchronization software 202, other software running on client device 102, and/or client device 102. For example, content management system 106 might be unaware of any distinction between a request from server view 204 and any other request from another entity (e.g., a web browser) on client device 102. Server view 202 can then prepare elements (e.g., server elements 214, program elements 212 and/or operating system elements 224) for rendering (action 428). Action 428 can include executing any executable code included in the elements (e.g., scripting language such as JavaScript, compiled code, etc.). This can prevent any readjustment of server view 204 as the executable code runs (e.g., elements "popping in"). After action 426 is completed, server view 204 can remove the indicator (displayed in action 420) and render elements (action 428). Server view 204 can then interact with synchronization software 202 through API 218 and content management system 106 through API 220 (action 440). For example, server view 204 can send and receive data with content management system 106 (e.g., user messages, updated server elements 214, etc.). Synchronization software 202 can then close server view 204 (not depicted in FIG. 4). This closure can be the result of user 402 navigating away from server view 204 within synchronization software 202, closing synchronization software 202, etc.

Figure 5A:
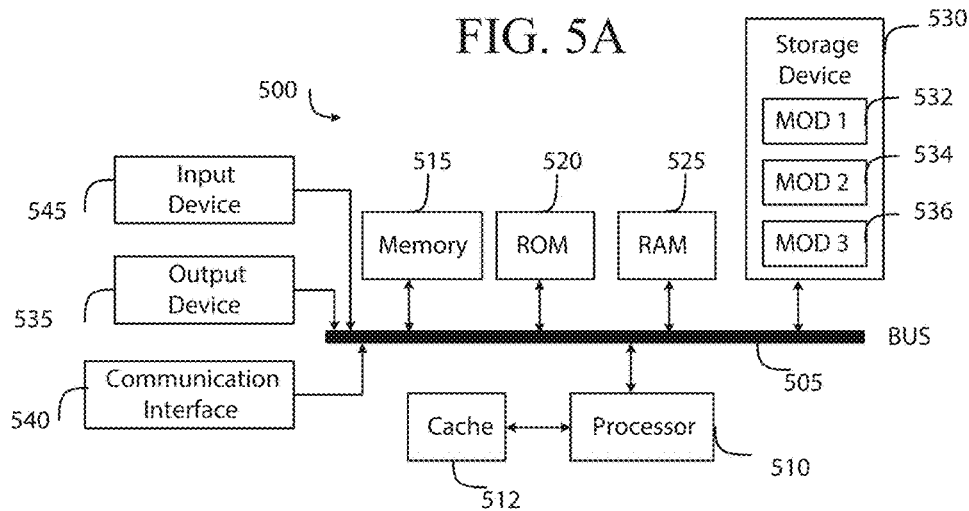
FIG. 5A shows an example possible system embodiment for implementing various embodiments of the present technology.
Figure 5B:
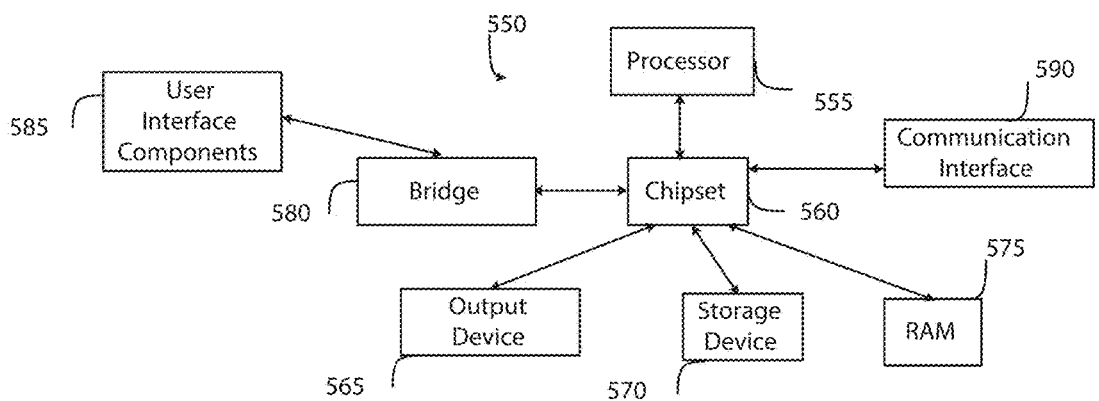
FIG. 5B shows an example possible system embodiment for implementing various embodiments of the present technology.

5A and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:
1. A computer-implemented method comprising:
   accessing a client secret and an authentication key, wherein the client secret is associated with a set of account privileges associated with an online-synchro- nized content management system, and wherein the authentication key is associated with a subset of the set of account privileges;

generating a server view of the online-synchronized content management system using instantiation data, the instantiation data including the authentication key;

transmitting a request for server elements from the online-synchronized content management system using the authentication key;

receiving the server elements from the online-synchronized content management system; and rendering the server elements.

2. The computer-implemented method of claim 1, further comprising sending the client secret to the online-synchronized content management system; and receiving the authentication key.

3. The computer-implemented method of claim 2, further comprising:

initiating an application programming interface (API) transaction with the online-synchronized content management system using the client secret.

4. The computer-implemented method of claim 1, wherein the set of account privileges are associated with a user account for the online-synchronized content management system.

5. The computer-implemented method of claim 1, wherein the server view stores the authentication key in a browser cookie, transmits the request for the server elements, receives the server elements from the online-synchronized content management system, and renders the server elements.

6. The computer-implemented method of claim 1, wherein the generating of the server view is performed in response to receiving a notification that there is updated content available to display.

7. The computer-implemented method of claim 6, wherein the updated content includes a user comment associated with a content item hosted on the online-synchronized content management system.

8. The computer-implemented method of claim 1, further comprising:

rendering program elements within a window; and determining that a portion of the window should be populated by server elements, the portion of the window having a portion width and a portion height;

wherein the server view is configured to render the server elements within the portion of the window using the portion width and the portion height.

9. The computer-implemented method of claim 1, wherein the server view contains a sharing interface, the sharing interface facilitating sharing of content items stored on the online-synchronized content management system.

10. A computer-readable medium storing non-transitory computer-readable instructions for causing a computer to:

access a client secret and an authentication key, wherein the client secret is associated with a set of account privileges associated with an online-synchronized content management system, and wherein the authentication key is associated with a subset of the set of account privileges;

generate a server view of the online-synchronized content management system using instantiation data, the instantiation data including the authentication key;

transmit a request for server elements from the online-synchronized content management system using the authentication key;

receive the server elements from the online-synchronized content management system; and render the server elements.

11. The computer-readable medium of claim 10, wherein the non-transitory computer-readable instructions further cause the computer to:

send the client secret to the online-synchronized content management system; and receive the authentication key.

12. The computer-readable medium of claim 10, wherein the server view is further configured to:

display an indicator indicating that the server elements are not yet available for display; and detect that the server elements are available for display before rendering the server elements.

13. The computer-readable medium of claim 10, wherein the instantiation data further includes a localization preference and the server elements contains content configured for the localization.

14. The computer-readable medium of claim 10, wherein generating the server view is performed in response to receiving a notification that there is updated content available to display.

15. The computer-readable medium of claim 14, wherein the updated content includes a user comment associated with a content item hosted on the online-synchronized content management system.

16. The computer-readable medium of claim 10, wherein the non-transitory computer-readable instructions further cause the computer to:

render program elements within a window; and determine that a portion of the window should be populated by server elements, the portion of the window having a portion width and a portion height;

wherein the server view is configured to render the server elements within the portion of the window using the portion width and the portion height.

17. The computer-readable medium of claim 10, wherein the server view contains a sharing interface, the sharing interface facilitating sharing of content items stored on the online-synchronized content management system.

18. A system comprising:

a processor;

a computer-readable medium; and non-transitory computer-readable instructions, stored on the computer-readable medium, that when executed by the processor are effective to cause the system to:

access a client secret and an authentication key, wherein the client secret is associated with a set of account privileges associated with an online-synchronized content management system, and wherein the authentication key is associated with a subset of the set of account privileges;

generate a server view of the online-synchronized content management system using instantiation data, the instantiation data including the authentication key;

transmit a request for server elements from the online-synchronized content management system using the authentication key;

receive the server elements from the online-synchronized content management system; and render the server elements.

19. The system of claim 18, wherein the instantiation data further includes a localization preference and the server elements contains content configured for the localization.

20. The system of claim 18, wherein generating the server view is performed in response to receiving a notification that there is updated content available to display, wherein the updated content includes a user comment associated with a content item hosted on an online-synchronized content management system.

21. The system of claim 18, wherein the non-transitory computer-readable instructions are further effective to cause the system to:
   render program elements within a window; and
   determine that a portion of the window should be populated by server elements, the portion of the window having a portion width and a portion height;
   wherein the server view is configured to render the server elements within the portion of the window using the portion width and the portion height.

* * * * *